United States Patent [19]
Peitsmeier et al.

[11] Patent Number: 5,769,453
[45] Date of Patent: Jun. 23, 1998

[54] ADJUSTING ARRANGEMENT FOR ADJUSTING THE SLOPE OF A SWIVELLABLY CONNECTED CASING TUBE OF A STEERING SPINDLE OF A MOTOR VEHICLE

[75] Inventors: Karl Peitsmeier, Aldingen; Helmut Patzelt, Kernen, both of Germany

[73] Assignee: Mercedes-Benz AG, Stuttgart, Germany

[21] Appl. No.: 665,907

[22] Filed: Jun. 19, 1996

[30] Foreign Application Priority Data

Jul. 3, 1995 [DE] Germany .................. 195 24 195.9

[51] Int. Cl.[6] .................................................. B62D 1/18
[52] U.S. Cl. ........................................... 280/775; 74/493
[58] Field of Search .................. 280/775, 771; 74/492, 493

[56] References Cited

U.S. PATENT DOCUMENTS

| | | | |
|---|---|---|---|
| 4,925,210 | 5/1990 | Peitsmeir | 280/775 |
| 5,075,586 | 12/1991 | Baskett | 74/493 X |
| 5,607,184 | 3/1997 | Barton | 280/775 |

FOREIGN PATENT DOCUMENTS

3536285C1  4/1987  Germany .
3737225C1  1/1989  Germany .

OTHER PUBLICATIONS

DE3737225C. Derwent Information Ltd. 1996. Abstract. Adjuster for setting angle of vehicle steering column. Jan. 5, 1989.

Translation of pertinent portions of JP (U) A 63 19469 Feb. 1988, Inventor: Takada, Tilt Steering Device.

*Primary Examiner*—Christopher P. Ellis
*Attorney, Agent, or Firm*—Evenson McKeown Edwards & Lenahan PLLC

[57] ABSTRACT

An adjusting arrangement for adjusting the slope of a swivellably connected casing tube of a steering spindle of a motor vehicle comprises a supporting device which is disposed on the vehicle body and with which the casing tube is connected by way of a spindle drive by means of which the casing tube can be adjusted with respect to the vehicle body. At least one steering lever having two mutually spaced, parallel swivel shafts acts between the casing tube and the vehicle body, of which one swivel shaft is assigned to the supporting device and the other swivel shaft forms a component of the spindle drive, and the spindle drive takes over the function of the steering lever.

8 Claims, 1 Drawing Sheet

U.S. Patent      Jun. 23, 1998      5,769,453
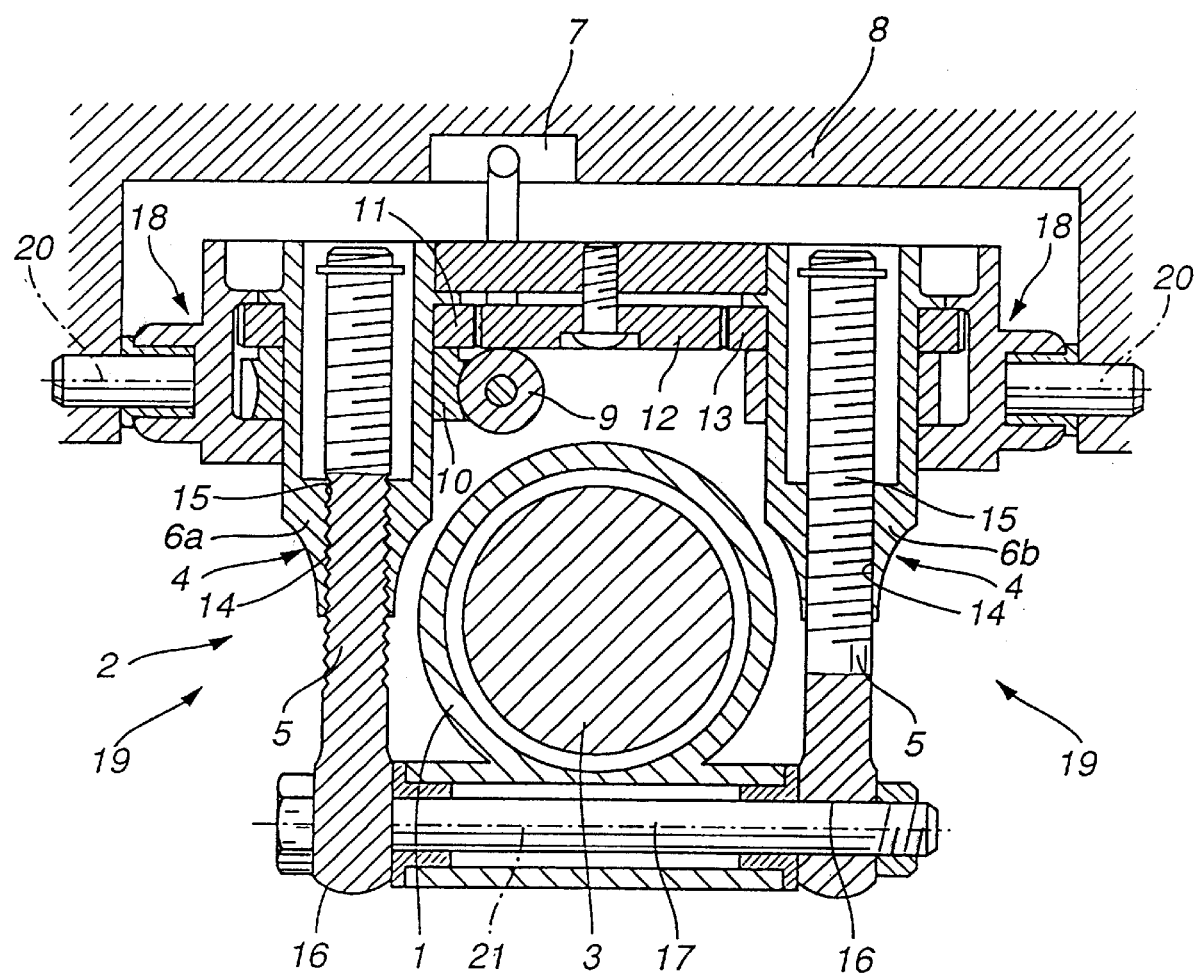

ADJUSTING ARRANGEMENT FOR ADJUSTING THE SLOPE OF A SWIVELLABLY CONNECTED CASING TUBE OF A STEERING SPINDLE OF A MOTOR VEHICLE

BACKGROUND AND SUMMARY OF THE INVENTION

This invention relates to an adjusting arrangement for adjusting the slope of a swivellably connected casing tube of a steering spindle of a motor vehicle having a supporting device which is disposed on the vehicle body and with which the casing tube is connected by way of a spindle drive by means of which the casing tube can be adjusted with respect to the vehicle body.

From German Patent Document DE 37 37 225 C1 an adjusting arrangement for changing the slope of a casing tube of a motor vehicle is known which comprises a rectangular frame which supports the casing tube on the vehicle body. The frame, which accommodates a spindle drive for adjusting the casing tube, is, in addition, constructed as a control arm in that its lateral parts are disposed on the end side in two mutually spaced parallel swivel shafts on the rectangularly adjoining parts of the frame. By means of these lateral steering levers, the swivelling of the casing tube is permitted on a radius about its distant swivel shaft with a straight-line displacement by the spindle drive along its spindle.

German Patent Document DE 35 36 285 C1 describes an adjustable steering column of a motor vehicle which is connected with the vehicle body by way of a longitudinally changeable connecting member. In this connecting member, no rotating movement, as in the case of a spindle drive, is supported, whereby it must simply be disposed in two parallel swivel shafts. However, the used piston-cylinder unit can only unreliably support the heavy weight of the whole steering column which is completely applied to the connecting member intended for adjusting the slope because the holding effect depends on the sealing of the piston in the cylinder. In addition, for the controllability of the piston-cylinder unit, the oil pressure in the system would have to be maintained in a continuous manner.

Japanese Patent Document JP-A-63-19469 (1988) shows a slope adjustment on a steering column, in the case of which a spindle drive lifts a supporting web to which the casing tube is fixed. A compensation between the adjusting radius and the straight-line adjusting movement cannot be recognized here and must therefore take place at a different point, for example, in the lower swivel bearing, so that the adjusting movement does not result in a jamming.

It is an object of the invention to construct an adjusting arrangement of the above-mentioned type in an operable manner by means of a few components.

This object is achieved by providing an arrangement wherein at least one steering lever with two mutually spaced, parallel swivel shafts are provided acting between the casing tube and the vehicle body, of which one swivel shaft is assigned to the supporting device, and wherein the other swivel shaft forms a component of a spindle drive and the spindle drive takes over the function of the steering lever.

The adjusting arrangement for adjusting the slope of a swivellably connected casing tube of a steering spindle of a motor vehicle ensures by means of the spindle drive a secure force-locking support of the casing tube and of the steering column in any adjusted swivel position.

Despite the straight-line adjusting path of the spindle drive, a swivel movement of the casing tube is facilitated by means of the additional steering lever function in the spindle drive. These functions are achieved by means of an arrangement with only a few components.

One of the swivel shafts of the steering lever is integrated in the supporting device and the other swivel shaft is integrated in the spindle drive, whereby a separate steering lever is saved. In this case, it is advantageous for the manufacturing to dispose the supporting device itself in this swivel shaft in a swivellable manner on the vehicle body and to provide the other swivel shaft on the non-rotatable part (spindle or nut) of the spindle drive.

In addition, it is particularly useful, in the case of a supporting device swivellably disposed on the vehicle body, to dispose the part of the spindle drive, which rotates by means of the drive and which moves its counterpart in the longitudinal direction, on the supporting device and to drive it by way of a bendable or flexible shaft so that the drive can be fixed to be resting on the vehicle body. As a result, the drive must neither be moved together with the movement of the casing tube as an additional weight, nor is the vibrational stress of the casing tube increased by means of the drive.

Other objects, advantages and novel features of the present invention will become apparent from the following detailed description of the invention when considered in conjunction with the accompanying drawings.

BRIEF DESCRIPTION OF THE DRAWING

The single drawing figure is a sectional view of a steering wheel spindle an adjusting arrangement supported assembly constructed according to a preferred embodiment of the invention.

DETAILED DESCRIPTION OF THE DRAWING

The drawing figure is a sectional view transversely to the longitudinal axis of a casing tube 1 in the area of an adjusting arrangement 2 which is used for adjusting the slope of the casing tube 1 swivellably connected on the distant lower end.

The casing tube 1 accommodates a rotatable steering spindle 3 which transmits the steering movement from the steering wheel in the vehicle interior to the steering gear and the vehicle wheels.

In order to be able to adapt the height of the steering wheel to the sitting position of the occupant, the casing tube 1 may be lifted or lowered and locked in the desired height position.

For this purpose, the adjusting arrangement 2 comprises a spindle drive 4 with two non-rotatably disposed spindles 5 and rotatable adjusting nuts 6a, 6b which interact therewith. In another construction, the spindles may also be driven and the adjusting nuts may be disposed in a non-rotatable manner.

A drive 7, which is shown here only symbolically and which, in order not to stress the movable parts by means of its weight, is fixed to the vehicle body 8 which is only outlined here, drives a bendable drive shaft 9 which, in turn, acts in a rotating manner on a worm gear 10 which is non-rotatably disposed on the adjusting nut and therefore rotates it also. Synchronously, by way of an also co-rotated output gear 11 and a countergear 12, a drive gear 13 of the adjusting nut 6b is acted upon, whereby it is rotated with the same rotating direction and rotating speed as the adjusting nut 6a.

By means of the rotating movement of the adjusting nuts 6a, 6b, by way of the engagement of an internal toothing 14 into the thread 15 of the spindles 5, the respective assigned spindle 5 is displaced between two end stops in its longitudinal direction.

The spindles 5 are in each case disposed in a swivel bearing 16 on a support 17 on which the casing tube 1 is fastened. In this case, the casing tube 1 is disposed between the spindles 5, whereby the transverse forces onto the casing tube 1 can be supported with a smaller lever path in the spindle drive 4 than if the casing tube 1 were suspended on the bottom of the support 17. By means of the shifting of the spindles 5, the casing tube 1 is therefore lifted or lowered at this point and its slope is therefore adjusted whereby the steering wheel is then also changed in its height position. When the spindles 5 are not moved by means of the drive 7, they are non-rotatable whereby the slope of the casing tube 1 is maintained in a form-locking manner.

A component of the adjusting arrangement 2 is a supporting device 18 which has the purpose of disposing the casing tube 1 on the vehicle body 8. It supports the adjusting nuts 6a, 6b non-slidably in the longitudinal direction but rotatably about the longitudinal shaft and is also used for the bearing of the gears 10, 11, 12 and 13. The bearing of the rotatable part of the spindle drive 4, in this case, of the adjusting nuts 6a, 6b results in an only short path to be bridged from the drive 7 to the adjusting nut 6a and 6b. The supporting device 18 is connected with the casing tube 1 by way of the spindle drive 4.

Since the casing tube 1, which is swivellably connected to the lower end, is moved on a circular path by way of the support 17 but the spindle drive 4 displaces the support 17 on a straight line, a steering lever 19 acts between the casing tube 1 and the vehicle body 8 and adapts these movements with respect to one another. For this purpose, two parallel swivel shafts 20 and 21 are assigned to the steering lever 19 and have a distance from one another which is sufficient for the swivelling. The steering lever 19 is not constructed as a separate component but is integrated in the adjusting arrangement 2 consisting of the supporting device 18, the spindle drive 4 and the support 17 of the casing tube 1. One of the swivel shafts is provided on the supporting device 18, this bearing simultaneously also containing the bearing of the supporting device 18 on the vehicle body 8, and therefore no further fastening having to be provided. The corresponding swivel shaft 21 is implemented on the distant end of the spindles 5 in the respective swivel bearings 16, in which case then the effective length consisting of the adjusting nut 6a or 6b and the spindle 5 between these two swivel shafts 20 and 21 takes over the steering lever function.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Adjusting arrangement for adjusting the slope of a swivellably connected casing tube of a steering spindle of a motor vehicle, having a supporting device which is disposed on the vehicle body and with which the casing tube is connected by way of a spindle drive of which the casing tube can be adjusted with respect to the vehicle body, at least one steering lever with two mutually spaced, parallel swivel shafts acting between the casing tube and the vehicle body, of which one swivel shaft is assigned to the supporting device, wherein the other swivel shaft forms a component of the spindle drive and the spindle drive takes over the function of the steering lever.

2. Adjusting arrangement according to claim 1, wherein the supporting device is swivellably disposed on the vehicle body in one swivel shaft.

3. Adjusting arrangement according to claim 1, wherein a non-rotatable spindle of the spindle drive is assigned to the casing tube, and an adjusting nut of the spindle drive is assigned to the supporting device.

4. Adjusting arrangement according to claim 3, wherein the spindle is disposed in an end-side bearing in the swivel shaft swivellably with respect to the casing tube.

5. Adjusting arrangement according to claim 1, wherein a driving engine is fixed on the vehicle body and acts upon a flexible or bendable drive shaft.

6. A steering spindle support assembly comprising:

a casing supportably surrounding a steering spindle, a first pivot assembly supporting the casing and defining a first pivot axis, a second pivot assembly pivotally connected to fixed vehicle parts and defining a second pivot axis parallel to and spaced from the first pivot axis, and an adjustable linkage connecting the first and second pivot assemblies.

7. A steering spindle support assembly according to claim 6, wherein said adjustable linkage includes a pair of longitudinally adjustable spindles disposed at opposite sides of the steering spindles.

8. A steering spindle support assembly according to claim 7, wherein the spindles are threaded bolts with relatively rotatable drive nuts operable to adjustably change a spacing of the first and second pivot axis to thereby adjust the casing and steering spindle position.

\* \* \* \* \*